United States Patent
Kitamura et al.

(10) Patent No.: US 10,479,133 B2
(45) Date of Patent: Nov. 19, 2019

(54) MOLDING FILM AND MOLDING TRANSFER FOIL USING SAME

(71) Applicant: Toray Industries, Inc., Tokyo (JP)

(72) Inventors: Yutaka Kitamura, Otsu (JP); Hisataka Tabata, Otsu (JP)

(73) Assignee: Toray Industries, Inc., Tokyo (JP)

( * ) Notice: Subject to any disclaimer, the term of this patent is extended or adjusted under 35 U.S.C. 154(b) by 117 days.

(21) Appl. No.: 15/323,829

(22) PCT Filed: Jun. 24, 2015

(86) PCT No.: PCT/JP2015/068207
§ 371 (c)(1),
(2) Date: Jan. 4, 2017

(87) PCT Pub. No.: WO2016/006448
PCT Pub. Date: Jan. 14, 2016

(65) Prior Publication Data
US 2017/0144474 A1 May 25, 2017

(30) Foreign Application Priority Data

Jul. 7, 2014 (JP) .................. 2014-139398
Oct. 27, 2014 (JP) .................. 2014-218041

(51) Int. Cl.
*B44C 1/17* (2006.01)
*B32B 27/32* (2006.01)
*B32B 27/08* (2006.01)
*B32B 7/12* (2006.01)
*C08J 5/18* (2006.01)

(52) U.S. Cl.
CPC .............. *B44C 1/1704* (2013.01); *B32B 7/12* (2013.01); *B32B 27/08* (2013.01); *B32B 27/32* (2013.01); *B32B 27/325* (2013.01); *C08J 5/18* (2013.01)

(58) Field of Classification Search
CPC ....... B44C 1/1704; B32B 7/12; B32B 27/325; B32B 27/08; B32B 27/32; B32B 2270/00; B32B 2307/40; B32B 2307/538; B32B 2307/406; B32B 2307/736; B32B 2255/10; C08J 5/18
See application file for complete search history.

(56) References Cited

U.S. PATENT DOCUMENTS

2014/0147666 A1* 5/2014 Sakamoto ................ B32B 1/00
428/354
2014/0170379 A1* 6/2014 Manabe .................... C08J 5/18
428/141
2015/0344647 A1 12/2015 Maeda et al.

FOREIGN PATENT DOCUMENTS

| JP | 02-016049 A | 1/1990 |
| JP | 2005-288729 A | 10/2005 |
| JP | 2006-027052 A | 2/2006 |
| JP | 2008-179687 A | 8/2008 |
| JP | 2010-194905 A | 9/2010 |
| JP | 2012-140498 A | 7/2012 |
| JP | 2012-206299 A | 10/2012 |
| JP | 2013-063612 A | 4/2013 |
| JP | 2013-071419 A | 4/2013 |
| WO | 2012/035956 A1 | 3/2012 |
| WO | WO-2013027547 A1 * | 2/2013 ................ C08J 5/18 |
| WO | 2014/103988 A1 | 7/2014 |

* cited by examiner

*Primary Examiner* — Nathan L Van Sell
(74) *Attorney, Agent, or Firm* — DLA Piper LLP (US)

(57) ABSTRACT

A film for molding has an annular olefin-based resin as the main component thereof and is characterized by an X surface and a Y surface both having a surface glossiness of no more than 50%, when one surface is the X surface and the other surface is the Y surface. The film has excellent winding properties during processing, has high design properties and excellent fingerprint wipe-off properties for the surface of product members (molded members after molding and decoration) when the film is used as a transfer foil for molding.

7 Claims, No Drawings

MOLDING FILM AND MOLDING TRANSFER FOIL USING SAME

TECHNICAL FIELD

This disclosure relates to a molding film comprising a cyclic olefin-based resin.

BACKGROUND

Recent increases in environment awareness have led to a higher demand for solvent-less coatings, plating alternative materials and the like for construction materials, automobile parts, mobile phones, electric devices and the like. Accordingly, decoration with a film has been more widely employed. As a method of decorating a base member in a three-dimensional shape, a method of transferring a lamination of a thermoplastic resin film and a design layer to a base member at the same time of molding has been known. Moreover, a film including polyolefin resin for use in such a decorating method has been proposed. However, the use of a polyolefin resin film for the purpose of decoration does not provide excellent quality in surface appearance and, therefore, various attempts to improve the polyolefin resin film to a practical level have been made.

For example, Japanese Patent Laid-open Publication No. 2013-071419 discloses a configuration designed to attain surface appearance together with processability and deep drawing moldability by using a film mainly made of a cyclic olefin-based resin. Moreover, Japanese Patent Laid-open Publication No. 2013-063612 discloses a configuration designed to attain a winding property at manufacturing and processing stages together with smoothness of a molding transfer surface by using a film having an uneven area on both its ends in a transverse direction.

In JP '419 and JP '612, attainment of the winding property at the processing stage together with a design property for a surface of a product member ("product member" herein refers to as a molded member after molding decoration) has not been sufficiently studied.

That is, while the surface appearance and processability of the film for use in molding have been studied so far, it has not been sufficiently considered in configuration of attainment of the winding property at the processing stage together with the design property and a fingerprint wipe-off property for a surface of a product member when the film is used as a molding transfer foil.

In view of the aforementioned background of conventional methods, it could be helpful to provide an excellent winding property at the processing stage as well as a high design property and an excellent fingerprint wipe-off property for a surface of a product member when the film is used as a molding transfer foil.

SUMMARY

We provide:
(1) A molding film comprising mainly a cyclic olefin-based resin, wherein when an X surface represents one of surfaces of the film and a Y surface represents another surface of the film, the X surface and the Y surface both have a surface glossiness of 50% or less.
(2) The molding film according to (1), wherein when the X surface represents a surface having a surface glossiness equal to or greater than a surface glossiness of the Y surface, the X surface has a surface roughness SRa of not less than 100 nm and not more than 1500 nm and the Y surface has a surface roughness SRa of not less than 100 nm and not more than 2000 nm.
(3) The molding film according to (1) or (2), which comprises an A layer and a B layer, wherein when the A layer contains a cyclic olefin-based resin of not less than 50% by mass and not more than 100% by mass and a polyethylene-based resin and/or polypropylene-based resin of not less than 1% by mass and not more than 40% by mass in total with respect to 100% by mass of the layers in total, and the B layer contains a cyclic olefin-based resin of not less than 50% by mass and not more than 100% by mass and a polyethylene-based resin and/or polypropylene-based resin of not less than 1% by mass and not more than 40% by mass in total with respect to 100% by mass of the layers in total, the A layer is greater than the B layer in terms of a total content (% by mass) of the polyethylene-based resin and/or polypropylene-based resin in the layers.
(4) The molding film according to any one of (1) to (3), wherein a ratio between a thermal shrinkage in a transverse direction and a thermal shrinkage in a machine direction at 80° C. satisfies −5< the thermal shrinkage in the transverse direction/the thermal shrinkage in the machine direction <−0.1.
(5) A molding transfer foil comprising the molding film according to any one of (1) to (4), and a design layer and an adhesive layer formed in this order on the molding film, wherein when a Y surface represents a surface having a surface glossiness equal to or lower than a surface glossiness of an X surface, the Y surface is an outmost surface of one side of the molding transfer foil.

The molding film is excellent in surface appearance of a product member when the molding film is used for decoration, and in winding property at processes such as coating, lamination, printing, deposition and the like, and further is capable of giving a product member a high design property and an excellent fingerprint wipe-off property in various molding methods such as vacuum molding, pressure molding, press molding. Therefore, the molding film is suitably applicable to decoration of molded members for construction materials, automobile parts, mobile phones, electric device, game device parts and the like.

DETAILED DESCRIPTION

We provide a molding film containing mainly a cyclic olefin-based resin, in which when an X surface represents one of surfaces of the film and a Y surface represents the other surface of the film, the X surface and the Y surface both have a surface glossiness of 50% or less, in terms of giving a good design property and fingerprint wipe-off property to a surface of a product member to which the film is used for decoration.

If the X surface has a surface glossiness of greater than 50%, a design surface applied on the film has high surface smoothness so that it may result in poor design property and fingerprint wipe-off property for a surface of a product member. The surface glossiness of the X surface is preferably not less than 10% and not more than 50%, and more preferably not less than 25% and not more than 45%.

Moreover, if the Y surface has a surface glossiness of greater than 50%, a molding film processed to have a design layer thereon becomes poor in smoothness so that it may result in wrinkling or breaking of the film, thereby lowering yield and consequently deteriorating productivity. The surface glossiness of the Y surface is preferably not less than 1% and not more than 30%, and more preferably not less than 2% and not more than 15%.

Methods of giving both the X surface and the Y surface a surface glossiness of not more than 50% in the film are not particularly limited. One example of such methods can include a method including extruding a resin to form a molding film from a T-die, and then solidifying a film obtained from the resin by cooling through a pair of a metal-made shaping roller and a rubber-made shaping roller, which are at a temperature of not less than 20° C. and not more than 60° C. By selecting temperature setting conditions such that in the pair of rollers, a roller shaping the X surface has a roller surface roughness Ra of not less than 0.2 μm and not more than 2.0 μm, while a roller shaping the Y surface has a roller surface roughness Ra of not less than 0.2 μm and not more than 4.0 μm, the X surface and the Y surface can have a surface glossiness of 50% or less.

The molding film mainly contains a cyclic olefin-based resin. The molding film mainly contains a cyclic olefin-based resin means that when total components of the film is 100% by mass, the molding film contains the cyclic olefin-based resin of not less than 50% by mass and not more than 100% by mass. In a molding film having a lamination structure with a plurality of layers, the phrase the molding film mainly contains a cyclic olefin-based resin means that when total components of the film is 100% by mass, i.e., when total components of all the layers is 100% by mass, the cyclic olefin-based resin contents in all of the layers accounts for not less than 50% by mass and not more than 100% by mass in total.

Surface Roughness of X and Y Surfaces

When the X surface represents a surface having a surface glossiness equal to or greater than a surface glossiness of the Y surface, the X surface preferably has a surface roughness SRa of not less than 100 nm and not more than 1500 nm and the Y surface preferably has a surface roughness SRa of not less than 100 nm and not more than 2000 nm in terms of obtaining a good design property and a fingerprint wipe-off property for a surface of a product member when a design layer is printed on the molding film to form a molding transfer foil, and the molding transfer foil is transferred to a molded member (adherend), and then only the molding film is peeled from the molding transfer foil. When both the X and Y surfaces are equal to each other in surface glossiness, a surface having a smaller surface roughness SRa is defined as the X surface, and a surface having a larger surface roughness SRa is defined as the Y surface.

It is preferable that the X surface have a surface roughness SRa of not more than 1500 nm because no uneven shape is generated on the design layer provided on the X surface so that a design property for a surface of a product member is made good. It is preferable that the X surface have a surface roughness SRa of not less than 100 nm because a molding film including the design layer on the X surface can secure surface slippage on the design layer, thereby allowing to perform winding of the molding film into a roll with good productivity without causing wrinkling or the like on the molding film. The surface roughness SRa of the X surface is more preferably not less than 100 nm and not more than 1000 nm, further preferably not less than 150 nm and not more than 700 nm, and especially preferably not less than 200 nm and not more than 500 nm.

Moreover, it is preferable that the Y surface have a surface roughness SRa of not more than 2000 nm because the film including the design layer on the X surface can be wound without transferring the surface unevenness of the Y surface to the design layer, thereby maintaining appropriate unevenness on the surface of the product member so that the design property is not deteriorated and good fingerprint wipe-off property is attained. On the other hand, it is preferable that the Y surface have a surface roughness of not less than 100 nm because a molding film including the design layer on the Y surface can secure surface slippage on the design layer, thereby allowing performing winding of the molding film into a roll with good productivity without causing wrinkling or the like on the molding film. The surface roughness SRa of the Y surface is more preferably not less than 250 nm and not more than 1500 nm, and further preferably not less than 500 nm and not more than 1000 nm.

Cyclic Olefin-Based Resin

The cyclic olefin-based resin refers to a resin being obtainable by polymerizing cyclic olefin monomers and having an alicyclic structure on its main chain.

Moreover, the cyclic olefin-based resin means that a total of components derived from the cyclic olefin monomers accounts for not less than 50% by mass and not more than 100% by mass in 100% by mass of this polymer. The cyclic olefin monomer is not particularly limited, but is preferably bicyclo[2,2,1]hept-2-ene (hereinafter, referred to as norbornene) in terms of productivity and surface properties.

Moreover, the cyclic olefin-based resin may be a resin obtainable by copolymerizing such cyclic olefin monomers with chain olefin monomers. The cyclic olefin-based resin is not particularly limited, but may be preferably a resin obtainable from bicyclo[2,2,1]hept-2-ene (hereinafter, referred to as norbornene), cyclopentadiene, 1,3-cyclohexadiene, or any of their derivatives in terms of productivity and surface properties.

The cyclic olefin-based resin may be a resin obtained by polymerizing cyclic olefin monomers only, or a resin obtained by copolymerizing cyclic olefin monomers with chain olefin monomers.

Methods of producing the resin obtained by polymerizing cyclic olefin monomers only include known methods such as addition polymerization of cyclic olefin monomers and open-ring polymerization and, for example, open-ring metathesis polymerization of norbornene and its derivatives followed by hydrogenation, addition polymerization of norbornene and its derivatives, and 1,2-, 1,4-addition polymerization of cyclopentadiene and cyclohexadiene followed by hydrogenation. Among these, a resin obtained by open-ring metathesis polymerization of norbornene and its derivatives followed by hydrogenation is most preferable in terms of productivity, surface property, and moldability.

In the resin obtained by copolymerizing cyclic olefin monomers with chain olefin monomers, the combination of the chain olefin monomers with the cyclic olefin monomers are not particularly limited, but ethylene is especially preferable in terms of productivity and cost. Methods of producing the resin obtained by copolymerizing cyclic olefin monomers with chain olefin monomers include known methods such as addition polymerization of cyclic olefin monomers with chain olefin monomers and, for example, addition polymerization of norbornene and its derivatives with ethylene. Among these, a copolymer of norbornene with ethylene is most preferable in terms of productivity, surface property, and moldability.

Moreover, as long as the molding film contains the cyclic olefin-based resin of not less than 50% by mass and not more than 100% by mass when the total components of the film is 100% by mass, the molding film may be composed of only cyclic olefin-based resin, or may contain an olefin-based resin other than the cyclic olefin-based resin, or may contain a resin other than the olefin-based resin.

Examples of the olefin-based resin other than the cyclic olefin-based resin that can be employed include various polyethylene-based resins such as low-density polyethylene, medium-density polyethylene, high-density polyethylene, linear low-density polyethylene, and ethylene-alpha-olefin copolymer polymerized using a metallocene catalyst; various polypropylene-based resins such as polypropylene, ethylene-propylene copolymer, and ethylene-propylene-butene copolymer; and polyolefin-based resins such as methyl pentene polymer. Moreover, polymers made of alpha-olefin monomers such as ethylene, propylene, butene-1, pentene-1,4-methylpentene-1, and hexene-1, octene-1, random polymers made of any of these alpha-olefin monomers, and block copolymers made of any of these alpha-olefin monomers, and the like are employable. Among these, various polyethylene-based resins and various polypropylene-based resins are preferably usable as the olefin-based resin other than the cyclic olefin-based resin in view of compatibility with cyclic olefin-based resin.

The content of the polyethylene-based resin and/or polypropylene-based resin in total is preferably not less than 1% by mass and not more than 40% by mass, further preferably not less than 1% by mass and not more than 30% by mass, and most preferably not less than 1% by mass and not more than 20% by mass with respect to 100% by mass of the total components of the film. Among the polyethylene-based resins and the polypropylene-based resin, the polyethylene-based resins are preferably usable, high-density polyethylene and linear low-density polyethylene are especially preferably usable, and linear low-density polyethylene is most preferably usable, in view of compatibility with the cyclic olefin-based resin.

The polyethylene-based resin means such a polymer that the total components derived from ethylene account for not less than 50% by mass and not more than 100% by mass in 100% by mass of the polymer. The polypropylene-based resin is such a polymer that the total components derived from polypropylene account for not less than 50% by mass and not more than 100% by mass in 100% by mass of the polymer.

Molding Film with Lamination Structure

The molding film includes an A layer and a B layer, and when the A layer contains a cyclic olefin-based resin of not less than 50% by mass and not more than 100% by mass and a polyethylene-based resin and/or polypropylene-based resin of not less than 1% by mass and not more than 40% by mass in total with respect to 100% by mass of the layers in total, and the B layer contains a cyclic olefin-based resin of not less than 50% by mass and not more than 100% by mass and a polyethylene-based resin and/or polypropylene-based resin of not less than 1% by mass and not more than 40% by mass in total with respect to 100% by mass of the layers in total, the A layer is greater than the B layer in terms of a total content (% by mass) of the polyethylene-based resin and/or polypropylene-based resin in the layers to attain toughness, quality, surface appearance at the same time.

In terms of improvement in moldability of the film as well as attainment of toughness and self-supporting property of the film, the layers A and B contains the polyethylene-based resin and/or polypropylene-based resin of more preferably not less than 1% by mass and not more than 30% by mass in total, and most preferably not less than 1% by mass and not more than 20% by mass in total with respect to 100% by mass of the respective layers in total.

When the molding film includes 3 or more layers each containing the cyclic olefin-based resin of not less than 50% by mass and not more than 100% by mass and the polyethylene-based resin and/or polypropylene-based resin of not less than 1% by mass and not more than 40% by mass in total with respect to 100% by mass of the layers in total, and the layers are different from each other in terms of their content of the polyethylene-based resin and/or polypropylene-based resin in total, one of the layers that is the greatest in content of the polyethylene-based resin and/or polypropylene-based resin in total is referred to as the A layer and the rests of the layers are referred to as the layers B.

In terms of further improving the moldability and surface appearance of the film, it is preferable that the molding film have a 3-layered structure of B layer/A layer/B layer as compared with a 2-layered structure of A layer/B layer.

Moreover, a lamination ratio between the A layer and the B layer(s) (=total B layer(s) thickness/the total A layer thickness) is preferably not less than 0.1 and not more than 2, more preferably not less than 0.15 and not more than 1.5, and most preferably not less than 0.2 and not more than 1. The total A layer thickness means the total thicknesses of A layers when there are a plurality of A layers. The same is true for the B layer(s).

The cyclic olefin-based resin is lower in toughness than the polyethylene-based resin or the polypropylene-based resin, but can be improved in toughness by being mixed with the polyethylene-based resin or the polypropylene-based resin. On the other hand, high content of the polyethylene-based resin or the polypropylene-based resin tends to cause deterioration of moldability and surface appearance.

The molding film is not particularly limited in terms of thickness, but is typically about 50 μm to 200 μm.

Ratio of Thermal Shrinkages in Transverse Direction and Machine Direction

When the molding film is provided with a design layer, a ratio between a thermal shrinkage in the transverse direction of the film and a thermal shrinkage in the machine direction of the film at 80° C. is preferably −5< the thermal shrinkage in the transverse direction/the thermal shrinkage in the machine direction <−0.1, more preferably −5< the thermal shrinkage in the transverse direction/the thermal shrinkage in the machine direction <−0.2, and most preferably −3< the thermal shrinkage in the transverse direction/the thermal shrinkage in the machine direction<−0.5, in terms of attaining good film dimensional property and flatness. The machine direction is referred to as a direction in which the film travels in the film manufacturing process, and the transverse direction is referred to as a direction parallel to a conveying plane for the film and perpendicular to the machine direction (hereinafter, these definitions are also applied below).

Methods of making the ratio between thermal shrinkages in the film −5< the thermal shrinkage in the transverse direction/the thermal shrinkage in the machine direction <−0.1 are not particularly limited and, for example, a method can be mentioned in which the content of the polyethylene-based resin and/or polypropylene-based resin is set to not less than 1% by mass and not more than 30% by mass in total with respect to 100% by mass of the respective layers of the A layer(s) and the B layer(s) in total.

Molding Transfer Foil

The molding transfer foil includes the molding film, and a design layer and an adhesive layer formed in this order on the molding film, in which when a Y surface represents a surface having a surface glossiness equal to or lower than a surface glossiness of an X surface, the Y surface is preferably an outmost surface of one side of the molding transfer foil. That is, the molding transfer foil is preferably configured to include a design layer and an adhesive layer on the X surface of the molding film.

The design layer is a layer for adding decoration such as coloring, pattern, woodgrain tone, metal tone, or pearl tone.

In terms of attaining good scratch resistance, weatherability, and design property of the surface of the product member after the molding transfer foil is transferred to the molded member and then the molding film is peeled off from the molding transfer foil, it is preferable that the design layer have a 2-layered structure including a layer to add decoration to the design layer and a protective layer, rather than a single-layered structure having the design layer alone. In this case, it is preferable that the protective layer is laminated onto the side of the molding film.

The resin to be used for the protective layer is not particularly limited as long as the resin is a resin with high transparency, but polyester-based resin, polyolefin-based resin, acrylic resin, urethane-based resin, fluorine resin, polyvinyl acetate-based resin, vinyl chloride-vinyl acetate copolymer-based resin, ethylene-vinyl acetate copolymer-based resin, and the like are preferably usable. In terms of scratch resistance, thermosetting resin, ultraviolet-curable resin, and heat-ray curable resin are preferably usable.

Methods of forming the design layer on the molding film are not particularly limited, but, for example, the design layer can be formed by coating, printing, metal deposition or the like. In this case, as the resin to be used for the design layer, polyester-based resin, polyolefin-based resin, acrylic resin, urethane-based resin, fluorine resin, polyvinyl acetate-based resin, vinyl chloride-vinyl acetate copolymer-based resin, ethylene-vinyl acetate copolymer-based resin and the like are preferably usable. A coloring agent to be used is not particularly limited, but is appropriately selected from dyes, inorganic pigments, organic pigments and the like in consideration of dispersibility.

The design layer formed by coating or printing has a thickness of preferably not less than 1 μm and not more than 100 μm, further preferably not less than 2 μm and not more than 50 μm, and most preferably not less than 5 μm and not more than 40 μm in terms of color tone retention and design property after molding.

Moreover, when the design layer is formed by metal deposition, a method of forming a deposition thin film is not particularly limited, but, for example, vacuum deposition, EB deposition, sputtering, ion plating or the like is usable. A metal for the deposition can be preferably indium or tin, and especially preferably indium. The design layer preferably has a lamination thickness of not less than 0.001 μm and not more than 100 μm, further preferably not less than 0.01 μm and not more than 50 μm, and most preferably not less than 0.02 μm and not more than 30 μm.

To impart adherability to the molded member (referred to as adherent), an adhesive layer provided to the design layer may be of heat sensitive type or pressure sensitive type. To transfer to the molded member, the adhesive layer may be designed depending on the resin constituting the molded member. When the resin constituting the molded member is an acrylic resin, an acrylic resin may be preferably used for the adhesive layer, and when the resin constituting the molded member is a polyphenylene oxide-polystyrene-based resin, a polycarbonate-based resin, a styrene copolymer-based resin, or a polystyrene-based resin, an acrylic resin, a polystyrene-based resin, a polyamide-based resin or the like having affinity with the above-mentioned resin may be preferably used for the adhesive layer. When the molding resin is a polypropylene-based resin, a chlorinated polyolefin-based resin, a chlorinated ethylene-vinyl acetate copolymer-based resin, cyclized rubber, or a coumarone-indene-based resin is preferably usable.

The adhesive layer may be formed by various methods and may be formed, for example, by coating methods such as roll coating, gravure coating, and comma coating, and printing methods such as gravure printing and screen printing.

The molded member to be decorated with the molding transfer foil including the molding film is not particularly limited, but may be resins such as polypropylene resin, acrylic resin, polystyrene resin, polyacrylonitrile-styrene resin, and polyacrylonitrile-butadiene-styrene resin, a metal member and the like.

EXAMPLES

Our films will be described more specifically referring to Examples below. It should be noted that this disclosure is not limited to these Examples.
Measuring and Evaluating Methods
The measurements and evaluation described in Examples were carried out under the following conditions.
(1) Surface Glossiness
Surface glossiness was measured according to JIS Z-8741 (1997), by using a digital variable angle gloss meter UGV-5B (manufactured by Suga Test Instruments Co. Ltd.). Each surface of films was measured. The measurement was performed 5 times per surface and the resulting values were averaged. The measurement was performed under such conditions that incident angle was 60° and light receiving angle was 60°.
(2) Film Surface Roughness SRa
The surface roughness SRa of films was measured according to the parameters of ISO 25178 by surface conformation observation to obtain center plane average surface roughness SRa using a light interferometric microscope (Ryoka Systems Inc., VertScan 2.0) under such conditions that observation mode was Focus mode, filter was 530 nm white, and scan range was 105 nm. The measurement was performed by measuring 3 times per surface and the resulting values were averaged.
(3) Surface Roughness Ra of Shaping Roll
According to JIS B0601-2001, an average roughness Ra at two-dimensional centerline on a surface of a shaping roll was measured by using a surface roughness tester (Mitsutoyo Corporation; Surftest SJ210) to obtain a surface roughness Ra. The measurement was performed under such conditions that probe tip radius was 2 μm, measuring force was 0.75 mN, measuring length was 25 mm, cutoff value was 0.08 mm, and the measuring direction was the transverse direction of the shaping roll.
(4) Film Thickness and Layer Thickness
A total thickness of a film was measured as follows: using a dial gauge, thicknesses at 5 arbitrary points of a sample cut out from the film were measured and the resulting values were averaged.

A layer thickness of each layer of a film with a lamination structure was measured as follows: a photograph of transmitted light through a cross section of the film was taken by using a metal microscope Leica DMLM manufactured by Leica Microsystems with ×100 magnifications. On the photograph thus taken, thicknesses at 5 arbitrary points of each layer of the film with a lamination structure were measured, the resulting values were averaged to obtain a thickness of each layer.

(5) Thermal(Heat in Table 1-2, 2-2) Shrinkage Ratio (%)

A thermal shrinkage ratio in the machine direction was measured as follows: a film sample was prepared with a size of 250 mm in length along the machine direction and 10 mm in width along the direction (transverse direction) at 90° with respect to the machine direction. After marking with a standard line of 200 mm in length, the sample with a 3 g load attached thereto was heated at 80° C. for 5 minutes in a circulating hot air oven. Then, the shrinkage ratio of the film in the machine direction was calculated according to the following equation:

Thermal shrinkage ratio (%)={1−(length of standard line after heat treatment)/(length of standard line before heat treatment)}×100.

A thermal shrinkage ratio in the transverse direction was measured in a similar manner.

(6) Moldability of Molding Transfer Foil

A design layer was formed by coating a surface (X surface side) of a film roll sample with black ink by using an applicator, the black ink being obtained by dispersing carbon black in an acrylic resin (Toyo Chemicals Co., Ltd.; 6500B). Then, the film roll sample was cut into a size of 200 mm×300 mm at an arbitrary position, thereby preparing a sample. After coating of a surface of the design layer of the sample with a urethane-based adhesive ("TYFORCE" (Registered Trademark) HH-100 manufactured by DIC Corporation) by using an applicator, the sample was dried at 80° C. for 10 minutes to form an adhesive layer of 20 μm in coating thickness. The lamination film including the adhesive layer formed thereon was heated by using a three-dimensional vacuum heating molding machine (TOM molding machine/NGF-0406-T) to 120° C., and vacuum/pressure molding (pressure: 0.2 MPa) was performed along a polypropylene resin mold (bottom surface diameter 150 mm) heated to 50° C., thereby obtaining a molded member provided with a structure of film/design layer/adhesive layer/polypropylene resin mold. The molded member thus obtained was evaluated with the following criteria as to molded state molded according to the mold (drawing ratio: molding height/bottom surface diameter):

A: Successfully molded with a drawing ratio of 1.0 or more.

B: Successfully molded with a drawing ratio of not less than 0.8 and less than 1.0, but failed to be molded with a drawing ratio of 1.0 or more.

C: Successfully molded with a drawing ratio of not less than 0.7 and less than 8.0, but failed to be molded with a drawing ratio of 0.8 or more.

D: Failed to be molded with a drawing ratio of 0.7.

(7) Processability at Design Layer Formation

A design layer of 30 μm in coating thickness was formed by coating a surface (X surface side) of a film roll sample with black ink by using an applicator, the black ink being obtained by dispersing carbon black in an acrylic resin (Toyo Chemicals Co., Ltd.; 6500B), and drying the resulting sample at 80° C. for 5 minutes. The molding film with the design layer thus obtained was observed as to dimensional changes in the transverse direction and the machine direction, and the processability was evaluated according to the following criteria:

The dimensional changes were calculated out by measuring, with use of a caliper, the changes in length in the transverse direction and the machine direction before and after drying.

A: The film did not dimensionally change both in the transverse direction and the machine direction.

B: The film changed dimensionally in any of the transverse direction and the machine direction by less than 10 mm.

C: The film changed dimensionally in any of the transverse direction and the machine direction by 10 mm or more.

(8) Processability of Molding Transfer Foil

The film roll sample coated with black ink obtained by dispersing carbon black in an acrylic resin (Toyo Chemicals Co., Ltd.; 6500B), which was obtained as described in (6), was set on a feeding reel of a die coater. The film was conveyed at a conveying speed of 30 m/minute, and wound at a winding side. During this process, a conveying state of the film was observed, and the processability was evaluated according to the following criteria:

B: The film was successfully wound without wrinkling.

C: The film was wound but with wrinkling.

D: The film failed to be wound.

(9) Surface Appearance of Product Member

A design layer of 30 μm in coating thickness was formed by coating an X surface side of a film roll sample with black ink by using a die coater, the black ink being obtained by dispersing carbon black in an acrylic resin (Toyo Chemicals Co., Ltd.; 6500B), and drying the resulting sample at 80° C. for 10 minutes. Further a urethane-based adhesive ("TYFORCE" (Registered Trademark) HH-100 manufactured by DIC Corporation) was coated on the design layer by using an applicator, and then the resulting sample was dried at 80° C. for 10 minutes to form an adhesive layer of 20 μm in coating thickness, thereby preparing a molding transfer foil roll.

A film in a size of 200 mm×300 mm was cut out from the molding transfer foil roll thus obtained at an arbitrary portion. The cut-out film was subjected to vacuum/pressure molding to obtain a molded member provided with a molding film of molding film/design layer/adhesive layer/polypropylene resin mold. The molded member thus obtained was subjected to ultraviolet radiation at a radiation intensity of 2,000 mJ/cm$^2$ to cure the coating. Then, a surface of a product member (design layer/adhesive layer/polypropylene resin mold) prepared by peeling off only the molding film from the molded member was observed and evaluated visually according to the following criteria:

A: Very high design property for surface.

B: High design property for surface with smooth or slightly rough surface shape.

C: Poor design property for surface with very rough surface shape.

(10) Fingerprint Wipe-Off Property for Surface of Product Member

After three times rubbing of the thumb and a finger (index finger) from which a fingerprint is transferred on a surface of the product member, the index finger is pressed onto a surface of a surface layer slowly. Immediately after pressing, the wipe-off property was evaluated, with use of a cleaning cloth "Traysee" (registered trademark) manufactured by Toray Industries Inc. by visual sensory assessment according to the following 4 stages:

A: The fingerprint was completely wiped off by wiping 4 times or less where the fingerprint was attached.

B: The fingerprint was completely wiped off by wiping 5 to 9 times, but not 4 times or less where the fingerprint was attached.

C: The fingerprint was completely wiped off by wiping 10 to 14 times, but not 9 times or less where the fingerprint was attached.

D: The fingerprint was not wiped off even by wiping more than and equal to 15 times where the fingerprint was attached.

(Cyclic Olefin-Based Resin A)

"TOPAS" (Registered Trademark) 8007F-04 manufactured by Polyplastics Co., Ltd.

(Cyclic Olefin-Based Resin B)

"TOPAS" (Registered Trademark) 6013F-04 manufactured by Polyplastics Co., Ltd.

(Cyclic Olefin-Based Resin C)

"ZEONOR" (Registered Trademark) 1060R manufactured by Zeon Corporation (Polyethylene-Based Resin)

"Evolue" (Registered Trademark) SP2540 manufactured by Prime Polymer Co., Ltd.

(Polypropylene-Based Resin)

"Prime Polypro" (Registered Trademark) J106 manufactured by Prime Polymer Co., Ltd.

Example 1

The compositions and constitutions of an A layer and a B layer were as illustrated in Tables 1-1 and 1-2. Each of resins was supplied to a single-screwed extruder (L/D=30). The resins were melted with 230° C. at a feeder section and 240° C. at subsequent sections and passed through a reef disc filter with a filter accuracy of 30 μm. The resins were laminated, in a feed block provided above a die, to form a lamination of B layer/A layer/B layer (see Table 1-2 for lamination thickness ratio). Then, the lamination was discharged via a T die (lip gap: 0.4 mm) in a sheet form on a mat-tone metal shaping roll (surface roughness Ra: 0.9 μm) whose temperature was regulated to 40° C. The sheet in this state was nipped with a mat-tone rubber shaping roll (surface roughness Ra: 1.7 μm, nip pressure: 0.2 MPa) whose temperature was regulated to 30° C. to obtain a molding film of 100 μm in film thickness.

Evaluation results of the molding film thus obtained, as well as a molding transfer foil and a molded member each including the molding film are illustrated in Table 1-2.

Examples 2 to 12, Comparative Examples 1 and 2

Molding films were prepared in the same manner as in Example 1, except that the compositions of the A layer and the B layer, the lamination ratios of the A layer and the B layer, the surface roughness Ra of the shaping roll for shaping the X surface and the Y surface, the materials, and the regulated temperature were as illustrated in Tables 1-1, 1-2, 2-1, and 2-2.

Evaluation results of the molding films thus obtained, as well as molding transfer foils and molded members each including the molding film are illustrated in Tables 1-2 and 2-2.

TABLE 1-1

| | | | Example 1 | Example 2 | Example 3 | Example 4 | Example 5 | Example 6 | Example 7 |
|---|---|---|---|---|---|---|---|---|---|
| Composition of A layer | Cyclic Olefin-based Resin (% by mass) | A | 65 | 65 | 65 | 65 | 65 | 65 | 65 |
| | | B | 30 | 30 | 30 | 30 | 30 | 30 | 30 |
| | | C | — | — | — | — | — | — | — |
| | Polyethylene-based Resin (% by mass) | | 5 | 5 | 5 | 5 | 5 | 5 | 5 |
| | Polypropylene-based Resin (% by mass) | | — | — | — | — | — | — | — |
| Composition of B layer | Cyclic Olefin-based Resin (% by mass) | A | 67 | 67 | 67 | 67 | 67 | 67 | — |
| | | B | 30 | 30 | 30 | 30 | 30 | 30 | — |
| | | C | — | — | — | — | — | — | 97 |
| | Polyethylene-based Resin (% by mass) | | 3 | 3 | 3 | 3 | 3 | 3 | 3 |
| | Polypropylene-based Resin (% by mass) | | — | — | — | — | — | — | — |
| Mat-tone Metal Roll (X surface formation) | Surface Roughness Ra (μm) | | 0.9 | 0.2 | 0.3 | 0.7 | 1.1 | 0.15 | 0.3 |
| | Temperature (° C.) | | 40 | 50 | 40 | 40 | 60 | 30 | 40 |
| Mat-tone Rubber Roll (Y surface formation) | Surface Roughness Ra (μm) | | 1.7 | 0.35 | 1.2 | 0.8 | 2.3 | 0.3 | 1.2 |
| | Temperature (° C.) | | 30 | 40 | 30 | 30 | 50 | 20 | 30 |

TABLE 1-2

| | | Example 1 | Example 2 | Example 3 | Example 4 | Example 5 | Example 6 | Example 7 |
|---|---|---|---|---|---|---|---|---|
| Heat Shrinkage | Heat Shrinkage in Width Direction (%) | −0.5 | −0.5 | −0.5 | −0.5 | −0.5 | −0.5 | −0.6 |
| | Heat Shrinkage in Machine Direction (%) | 0.5 | 0.5 | 0.5 | 0.5 | 0.5 | 0.5 | 0.3 |
| | Heat Shrinkage in Width Direction/ Heat Shrinkage in Machine Direction | −1 | −1 | −1 | −1 | −1 | −1 | −2 |
| | Lamination Structure (Thickness: μm) | B/A/B (15/70/15) | B/A/B (15/70/15) | B/A/B (15/70/15) | B/A/B (15/70/15) | B/A/B (15/70/15) | B/A/B (15/70/15) | B/A/B (15/70/15) |
| | Film Thickness (μm) | 100 | 100 | 100 | 100 | 100 | 100 | 100 |
| | Glossiness of X Surface of Film (%) | 10 | 42 | 30 | 25 | 5 | 45 | 30 |
| | Glossiness of Y Surface of Film (%) | 5 | 28 | 10 | 15 | 2 | 40 | 10 |
| | Surface Roughness SRa of X Surface of Film (nm) | 700 | 150 | 250 | 500 | 900 | 100 | 250 |
| | Surface Roughness SRa of Y Surface of Film (nm) | 1500 | 280 | 1000 | 650 | 1800 | 200 | 1000 |
| | Thickness of Design Layer (μm) | 30 | 30 | 30 | 30 | 30 | 30 | 30 |
| | Thickness of Adhesive Layer (μm) | 20 | 20 | 20 | 20 | 20 | 20 | 20 |
| | Molding Transfer Foil Structure | | | | Film/Design Layer/Adhesive Layer | | | |
| | Moldability of Molding Transfer Foil | A | A | A | A | A | A | A |
| | Processability at time of Design Layer Formation | A | A | A | A | A | A | A |
| | Processability of Molding Transfer Foil | B | C | B | B | B | C | B |
| | Surface Appearance of Product Member (Molded Member after Molding Decoration) | B | B | A | A | C | B | A |
| | Fingerprint Wipe-Off Property of Product Member (Molded Member after Molding Decoration) | A | B | A | A | A | C | A |

TABLE 2-1

|  |  |  | Example 8 | Example 9 | Example 10 | Example 11 | Example 12 | Comparative Example 1 | Comparative Example 2 |
|---|---|---|---|---|---|---|---|---|---|
| Composition of A layer | Cyclic Olefin-based Resin (% by mass) | A | 50 | 45 | 65 | 35 | 65 | 65 | 65 |
|  |  | B | 25 | 20 | 30 | 15 | 30 | 30 | 30 |
|  |  | C | — | — | — | — | — | — | — |
|  | Polyethylene-based Resin (% by mass) |  | 25 | 35 | 5 | 50 | — | 5 | 5 |
|  | Polypropylene-based Resin (% by mass) |  | — | — | — | — | 5 | — | — |
| Composition of B layer | Cyclic Olefin-based Resin (% by mass) | A | 50 | 40 | 67 | 37 | 67 | 67 | 67 |
|  |  | B | 27 | 27 | 30 | 15 | 30 | 30 | 30 |
|  |  | C | — | — | — | — | — | — | — |
|  | Polyethylene-based Resin (% by mass) |  | 23 | 33 | 3 | 48 | — | 3 | 3 |
|  | Polypropylene-based Resin (% by mass) |  | — | — | — | — | 3 | — | — |
| Mat-tone Metal Roll (X surface formation) | Surface Roughness Ra (μm) |  | 0.3 | 0.3 | 1.5 | 0.3 | 0.9 | 0.08 | 0.08 |
|  | Temperature (° C.) |  | 40 | 40 | 60 | 40 | 40 | 30 | 30 |
| Mat-tone Rubber Roll (Y surface formation) | Surface Roughness Ra (μm) |  | 1.2 | 1.2 | 2.3 | 1.2 | 1.7 | 2.8 | 0.12 |
|  | Temperature (° C.) |  | 30 | 30 | 50 | 30 | 30 | 30 | 20 |

TABLE 2-2

|  |  | Example 8 | Example 9 | Example 10 | Example 11 | Example 12 | Comparative Example 1 | Comparative Example 2 |
|---|---|---|---|---|---|---|---|---|
| Heat Shrinkage | Heat Shrinkage in Width Direction (%) | −0.4 | −0.2 | −0.5 | 0.1 | −0.5 | −0.5 | −0.5 |
|  | Heat Shrinkage in Machine Direction (%) | 0.5 | 0.5 | 0.5 | 0.5 | 0.5 | 0.5 | 0.5 |
|  | Heat Shrinkage in Width Direction/Heat Shrinkage in Machine Direction | −0.8 | −0.4 | −1 | 0.2 | −1 | −1 | −1 |
| Lamination Structure (Thickness: μm) |  | B/A/B (15/70/15) | B/A/B (15/70/15) | B/A/B (15/70/15) | B/A/B (15/70/15) | B/A/B (15/70/15) | B/A/B (15/70/15) | B/A/B (15/70/15) |
| Film Thickness (μm) |  | 100 | 100 | 100 | 100 | 100 | 100 | 100 |
| Glossiness of X Surface of Film (%) |  | 25 | 21 | 3 | 10 | 10 | 90 | 90 |
| Glossiness of Y Surface of Film (%) |  | 10 | 8 | 2 | 5 | 5 | 1 | 75 |
| Surface Roughness SRa of X Surface of Film (nm) |  | 420 | 580 | 1200 | 250 | 700 | 50 | 50 |
| Surface Roughness SRa of Y Surface of Film (nm) |  | 1320 | 1560 | 1800 | 1000 | 1500 | 2500 | 90 |
| Thickness of Design Layer (μm) |  | 30 | 30 | 30 | 30 | 30 | 30 | 30 |
| Thickness of Adhesive Layer (μm) |  | 20 | 20 | 20 | 20 | 20 | 20 | 20 |
| Molding Transfer Foil Structure |  | Film/Design Layer/Adhesive Layer | | | | | | |
| Moldability of Molding Transfer Foil |  | B | C | A | A | A | A | A |
| Processability at time of Design Layer Formation |  | B | C | A | C | A | A | A |
| Processability of Molding Transfer Foil |  | B | C | B | D | B | D | D |
| Surface Appearance of Product Member (Molded Member after Molding Decoration) |  | B | C | C | B | B | B | B |
| Fingerprint Wipe-Off Property of Product Member (Molded Member after Molding Decoration) |  | A | A | A | A | A | A | D |

INDUSTRIAL APPLICABILITY

The film is excellent in winding property at the processing stage and provides a high surface design property and an excellent fingerprint wipe-off property to a surface of a product member when the film is used as a molding transfer foil. The molding film is excellent in surface appearance when the molding film is used for decoration, and in processability at the time of coating, lamination, printing, deposition and the like, of the film, and further is capable of providing a surface of a product member with a high design property and an excellent fingerprint wipe-off property in various molding methods such as vacuum molding, pressure molding, and press molding. Therefore, the molding film is suitably applicable to decoration of molded articles for construction materials, automobile parts, mobile phones, electric device, game device parts and the like.

The invention claimed is:

1. A molding film comprising mainly a cyclic olefin-based resin, wherein
when an X surface represents one surface of the film and a Y surface represents another surface of the film, the X surface and the Y surface both have a surface glossiness of 50% or less, and
a ratio between thermal shrinkage in a transverse direction and thermal shrinkage in a machine direction at 80° C. satisfies −2< the thermal shrinkage in the transverse direction/the thermal shrinkage in the machine direction <−0.5.

2. The molding film according to claim 1, wherein when the X surface represents a surface having a surface glossiness equal to or greater than a surface glossiness of the Y surface, the X surface has a surface roughness SRa of not less than 100 nm and not more than 1500 nm and the Y surface has a surface roughness SRa of not less than 100 nm and not more than 2000 nm.

3. The molding film according to claim 1, which comprises an A layer and a B layer, wherein
when the A layer contains a cyclic olefin-based resin of not less than 50% by mass and not more than 99% by mass and a polyethylene-based resin and/or polypropylene-based resin of not less than 1% by mass and not more than 40% by mass in total with respect to 100% by mass of the layers in total; and
the B layer contains a cyclic olefin-based resin of not less than 50% by mass and not more than 99% by mass and a polyethylene-based resin and/or polypropylene-based resin of not less than 1% by mass and not more than 40% by mass in total with respect to 100% by mass of the layers in total,
the A layer is greater than the B layer in terms of a total content (% by mass) of the polyethylene-based resin and/or polypropylene-based resin in the layers.

4. A molding transfer foil comprising the molding film according to claim 1, a design layer and an adhesive layer formed in this order on the molding film, wherein
when a Y surface represents a surface having a surface glossiness equal to or lower than a surface glossiness of an X surface, the Y surface is an outmost surface of one side of the molding transfer foil.

5. The molding film according to claim 2, which comprises an A layer and a B layer, wherein
when the A layer contains a cyclic olefin-based resin of not less than 50% by mass and not more than 99% by mass and a polyethylene-based resin and/or polypropylene-based resin of not less than 1% by mass and not more than 40% by mass in total with respect to 100% by mass of the layers in total; and
the B layer contains a cyclic olefin-based resin of not less than 50% by mass and not more than 99% by mass and a polyethylene-based resin and/or polypropylene-based resin of not less than 1% by mass and not more than 40% by mass in total with respect to 100% by mass of the layers in total,
the A layer is greater than the B layer in terms of a total content (% by mass) of the polyethylene-based resin and/or polypropylene-based resin in the layers.

6. A molding transfer foil comprising the molding film according to claim 2, a design layer and an adhesive layer formed in this order on the molding film, wherein
when a Y surface represents a surface having a surface glossiness equal to or lower than a surface glossiness of an X surface, the Y surface is an outmost surface of one side of the molding transfer foil.

7. A molding transfer foil comprising the molding film according to claim 3, a design layer and an adhesive layer formed in this order on the molding film, wherein
when a Y surface represents a surface having a surface glossiness equal to or lower than a surface glossiness of an X surface, the Y surface is an outmost surface of one side of the molding transfer foil.

* * * * *